E. E. HOLT.
TIRE VALVE AND THE LIKE.
APPLICATION FILED MAR. 21, 1919.
1,321,791.
Patented Nov. 11, 1919.
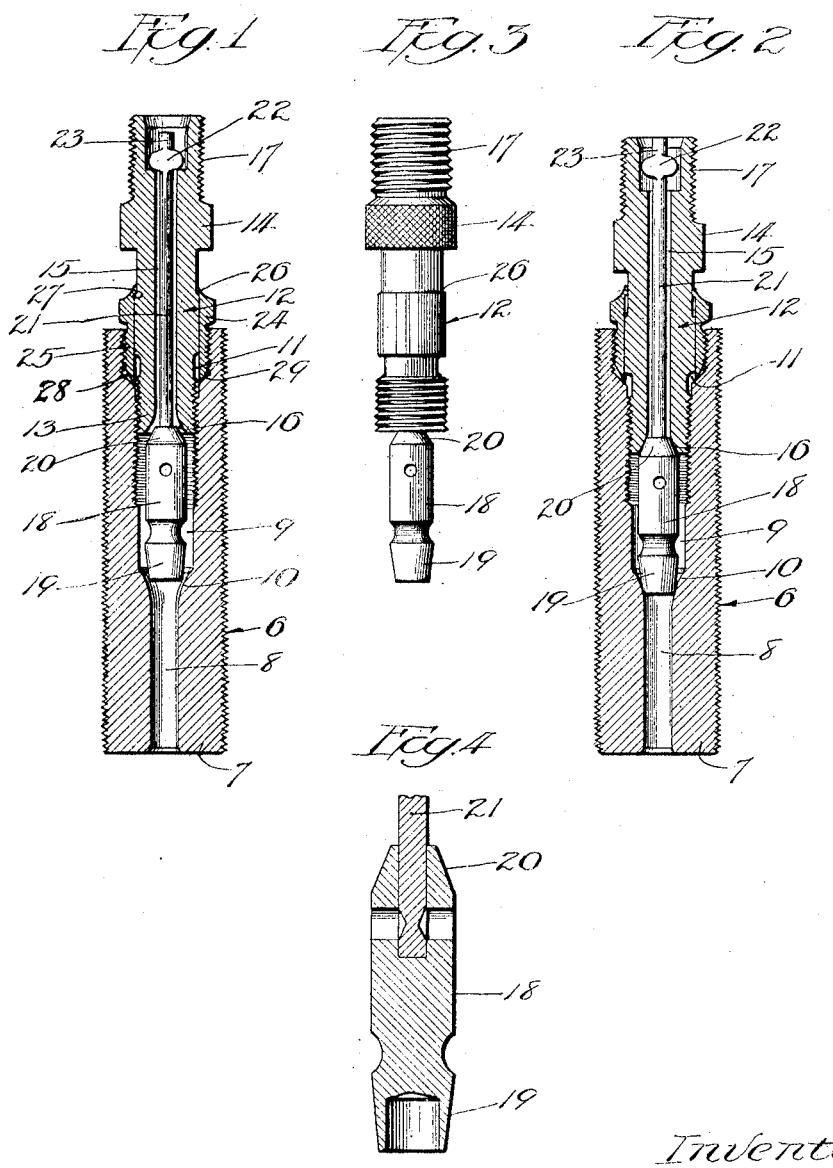

UNITED STATES PATENT OFFICE.

EDWARD E. HOLT, OF CHICAGO, ILLINOIS.

TIRE-VALVE AND THE LIKE.

1,321,791.  Specification of Letters Patent.  Patented Nov. 11, 1919.

Application filed March 21, 1919. Serial No. 284,042.

*To all whom it may concern:*

Be it known that I, EDWARD E. HOLT, a citizen of the United States, residing at Chicago, in the county of Cook and State of Illinois, have invented certain new and useful Improvements in Tire-Valves and the like, of which the following is a specification.

The present invention has reference to several improvements in pneumatic valves such as used on pneumatic tires and the like. The features of the invention have reference particularly to a construction of valve intended for use on pneumatic tires, but it will presently appear that certain of said features are not limited to this or any other particular class of service.

The general type of tire valve herein illustrated and particularly described is similar in certain respects to that shown and described in my co-pending application for Letters Patent of the United States on improvements in tire valves and the like, Serial No. 245,866, filed July 20, 1918. Certain features of the valve herein illustrated and described are also shown in Letters Patent of the United States Nos. 1,244,330, issued October 23, 1917, and 1,271,898, issued July 9, 1918, both for improvements in tire valves on applications filed by me.

While, as above explained, certain of the features of construction of the valve illustrated and described in this present case are also shown and described in the aforesaid application and Letters Patent, still I wish it distinctly understood that the features of the present invention are not limited to use in connection with such particular type or types of valve, except as I may limit myself in the claims.

One of the objects of the present invention is to provide a valve of such construction that it can be easily taken apart or assembled without the necessity of using special devices or appliances for this purpose. Another object is to provide a construction of valve which shall at all times remain air-tight when in normal operation, and also a valve which can be very easily manipulated by the user either for the purpose of inflation or for deflation.

Other objects and uses of the invention will appear from a detailed description of the same which consists in the features of construction and combinations of parts hereinafter described and claimed.

In the drawing:

Figure 1 shows a longitudinal section through a valve embodying the features of the present invention, the valve being open at both of its seats;

Fig. 2 shows a view similar to that of Fig. 1, with the exception that the valve is closed at both of its seats;

Fig. 3 shows a side view of the operating nut and the valve plug in assembled form; and Fig. 4 shows a detailed longitudinal section through the valve plug and the lower portion of the pin.

In the particular construction shown in the drawings there is provided a valve stem 6, the lower end 7 of which is intended to be connected to the tire in the usual manner. The outer surface of this stem is preferably threaded throughout a portion of its length, so that a valve cap may be screwed down over it to inclose the valve and protect the parts. A longitudinal bore or passage 8 extends through the lower portion of the stem. Said bore is enlarged or widened at the central point 9 and a tapered valve seat 10 is provided substantially at the point where the bores 8 and 9 come together.

The upper portion of the bore 9 is threaded and at its extreme upper end widens out into an enlarged bore 11 which is also threaded. An operating nut 12 has its lower end 13 threaded into the bore 9, so that it can be moved up and down by rotating its milled head portion 14. This operating nut is provided with a longitudinal bore 15, the lower end of which terminates in a tapered valve seat 16 facing in the opposite direction to the seat 10. Generally the upper end 17 of the operating nut will be threaded, so that the air hose can be connected thereto for purposes of inflation.

A valve plug 18 operates within the bore 9 and between the seats 10 and 16. The lower end 19 of said plug is tapered to engage the seat 10, and the upper end 20 is tapered to engage the seat 16. Consequently when the operating nut 12 is threaded down in the bore 9, the valve plug is compressed against both of the seats 10 and 16 in a very firm and air-tight manner.

A pin 21 is connected to the valve plug 18 and extends up through the bore 15 of the operating nut, said pin being of smaller size than the bore so as to permit air to move in or out through the bore. The upper end 22 of said pin is preferably enlarged by flattening or otherwise and works within the recess 23 in the upper end of the operating nut. The length of the pin 21 is such that when the operating nut is fully raised into the position shown in Fig. 1, the plug 18 will be held in suspended position between the seats 10 and 16, whereas when the operating nut is forced down, as shown in Fig. 2, the plug 18 will be forced home against both of its seats.

The general type of construction so far described is also shown in the aforesaid application for Letters Patent of the United States Serial No. 245,866. However, the construction disclosed herein differs from the aforesaid application in the provision of independent means for limiting the upward movement of the operating nut 12 when it is unthreaded as shown in Fig. 1. This means comprises a lock nut 24 having a neck 25 which threads into the upper end 11 of the bore of the valve stem. The upper end 26 of the nut 24 is beaded or flanged over a shoulder 27 on the operating nut 12, so that said operating nut cannot be raised a greater distance than is permitted by the engagement of the said shoulder with the flange 26. The lower end 28 of the nut 24 wedges against a shoulder 29 at the point where the bores 9 and 11 of the valve stem 6 come together. As is clearly evident from an examination of Figs. 1 and 2, the taper of the lower end 28 of the nut 24 is not as great as the taper of the seat 29 on the stem 26, so that a very tight wedging action is secured at this point, making it possible to force the nut 24 home in a very air-tight manner.

The nut 24 is assembled into the operating nut 12 and then its upper end 26 is flanged or beaded over, so that it is permanently locked into the operating nut 12. These operations will ordinarily be performed at the factory. The nut 24 may then be threaded down into the stem 26 whereupon the valve will be fully assembled, and this operation may be performed either at the factory or elsewhere. No special tools or equipment are necessary for assembling the nut 24 and stem 6, so that it is possible for the owner of the tire to take the valve apart if necessary for the insertion of a new plug or for any other reason which may seem proper.

While I have herein shown and described only a single embodiment of the features of the present invention, still I do not limit myself to said embodiment except as I may do so in the claims.

I wish to point out the fact that, when the operating nut 12 is fully withdrawn into the position shown in Fig. 1, so that its shoulder 27 is jammed against the bead 26, its threads are brought into stress with the threads of the valve stem, so as to produce a more air-tight engagement between these parts. I also wish to point out that the operating nut 12 is in smooth contact with the internal face of the lock nut 24, and this fact improves the air-tight nature of the construction.

I claim:

1. In a tire valve, the combination of a valve stem having a longitudinally extending bore, said bore being provided in its central portion with a shouldered seat, and being provided in its upper portion with an enlargement, the central portion of the bore and the enlargement being internally threaded, an operating nut threaded into the central portion of the bore and having a projecting operating end, the inner end of said operating nut being provided with a valve seat, there being a longitudinal passage through the operating nut, a valve plug between the seat of the valve stem and the seat on the end of the operating nut, a pin connected to the valve plug and extending through the bore of the operating nut, a lock nut between the operating nut and the upper end of the valve stem, said operating nut being threaded into the upper portion of the valve stem, there being an outwardly facing shoulder on the operating nut, and an inturned flange on the lock nut coöperating with said shoulder for the purpose specified.

2. In a tire valve, the combination of a valve stem having a longitudinally extending bore, there being an enlarged central portion in said bore, a valve seat at the lower end of said enlargement, and there being a further enlargement at the outer end of the bore, both the central enlargement and the second mentioned enlargement being internally threaded, an operating nut extending into the bore and in threaded engagement with the central enlargement, said operating nut being provided with a longitudinally extending bore, a valve plug between the inner end of the operating nut and the valve seat, a pin on said valve extending through the bore of the operating nut, and a lock nut between the operating nut and the second mentioned enlargement of the bore of the stem, said lock nut coöperating with the operating nut to limit the unthreading of the operating nut for the purpose specified.

3. In a device of the class described, the combination of a valve stem having a longitudinally extending bore, there being an outwardly facing valve seat in said bore, the bore being internally threaded between said seat and the outer end of the stem, an operating nut threaded into the bore, a plug valve between said operating nut and the valve seat, means on the plug valve coöperating with the operating nut to limit movement of the plug valve with respect to the nut, the outer end of the operating nut clearing the end portion of the bore, and a lock nut threaded into said end portion of the bore and surrounding the operating nut at that point, and means on said lock nut coöperating with the operating nut to limit the unthreading of the operating nut for the purpose specified.

4. In a device of the class described, the combination of a valve stem having a longitudinally extending bore, there being a valve seat in said bore, an operating nut longitudinally movable in the bore toward and from said valve seat, a valve plug between said operating nut and the valve seat, and a lock nut threaded into the outer end of the bore and surrounding the operating nut at that point, said lock nut coöperating with the operating nut to limit the unthreading thereof for the purpose speciled.

5. In a device of the class described, the combination of a valve stem having a longitudinally extending bore, a valve seat in said bore, an operating nut working in the bore beyond the valve seat, a plug valve between the operating nut and the valve seat, and a lock nut threaded to the outer end of the valve stem and coöperating with the operating nut to limit the unthreading thereof for the purpose specified.

EDWARD E. HOLT.

Copies of this patent may be obtained for five cents each, by addressing the "Commissioner of Patents, Washington, D. C."